(12) United States Patent
Shimizu et al.

(10) Patent No.: US 6,342,940 B1
(45) Date of Patent: Jan. 29, 2002

(54) OPTICAL PRINTER

(75) Inventors: Yukihiko Shimizu; Hiroshi Sakurada, both of Mobara (JP)

(73) Assignee: Futaba Denshi Kogyo Kabushiki Kaisha, Mobara (JP)

( * ) Notice: Subject to any disclaimer, the term of this patent is extended or adjusted under 35 U.S.C. 154(b) by 0 days.

(21) Appl. No.: 09/468,911

(22) Filed: Dec. 22, 1999

(30) Foreign Application Priority Data

Dec. 28, 1998 (JP) ............................................ 10-373541
Dec. 28, 1998 (JP) ............................................ 10-373542

(51) Int. Cl.$^7$ ........................ G03B 27/32; G03B 27/72; G03B 27/52
(52) U.S. Cl. ............................. 355/32; 355/35; 355/40
(58) Field of Search .............................. 355/27–29, 35, 355/40, 41, 32, 47–49

(56) References Cited

U.S. PATENT DOCUMENTS 4,916,479 A * 4/1990 Ujiie ............................ 355/28
5,432,580 A * 7/1995 Tokuda ........................ 354/298
6,169,562 B1 * 1/2001 Morimoto .................... 347/232

* cited by examiner

*Primary Examiner*—Russell Adams
*Assistant Examiner*—Hung Henry Nguyen
(74) *Attorney, Agent, or Firm*—Oblon, Spivak, McClelland, Maier & Neustadt, P.C.

(57) ABSTRACT

An optical printer including a fluorescent light-emitting tube equipped with an anode in a form of dot and a rotatable rotating filter part equipped with filters R, G, B. A film is moved relative to the optical printer set at a given position. A controlling device rotates the rotating filter part, and, in synchronization with that, the fluorescent light-emitting tube is made to emit light by the image signal of every color of red, green and blue. The image can be formed by moving the film one time relative to irradiation with the light in a state of a dot transmitted selectively through each filter of red, green and blue. Since the head is fixed and the film is moved, room for the movement of the head which has been conventionally required is not required. Spatial room for the slide of the filter is not required differently from the slide-switching type-filter of the conventional art.

12 Claims, 15 Drawing Sheets

FIG.2
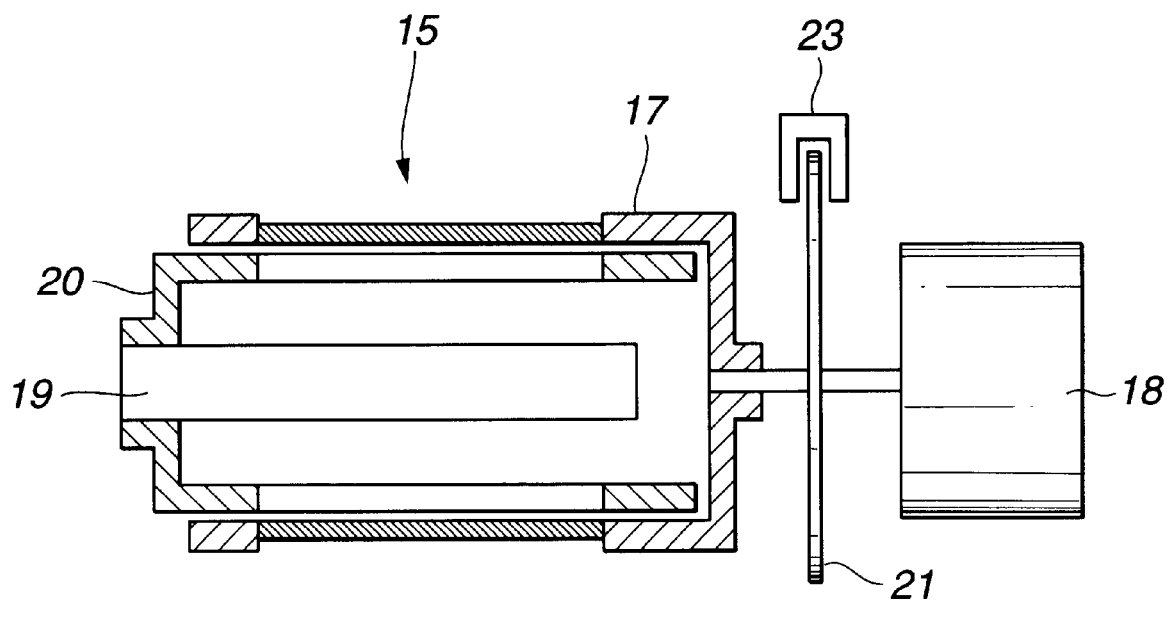
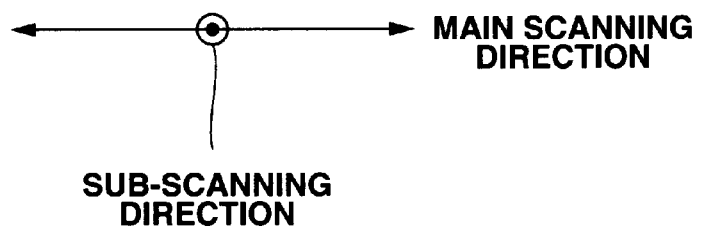

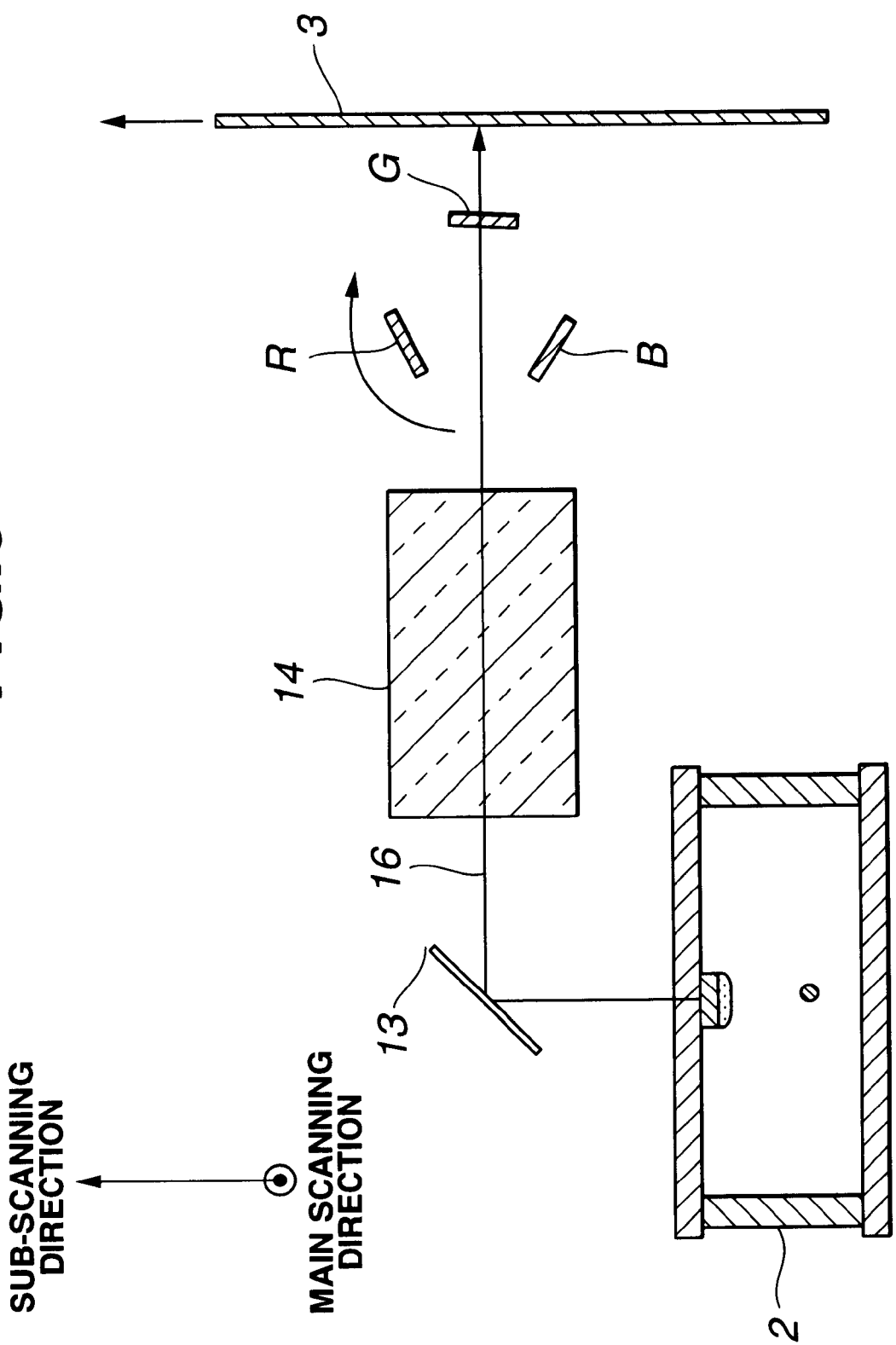

FIG.8(c)
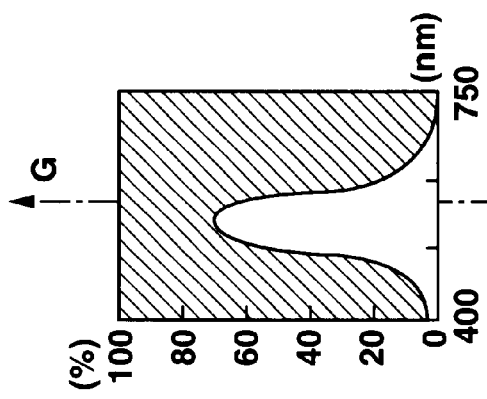
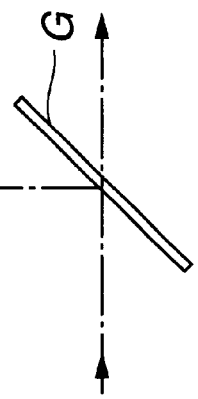
FIG.8(b)
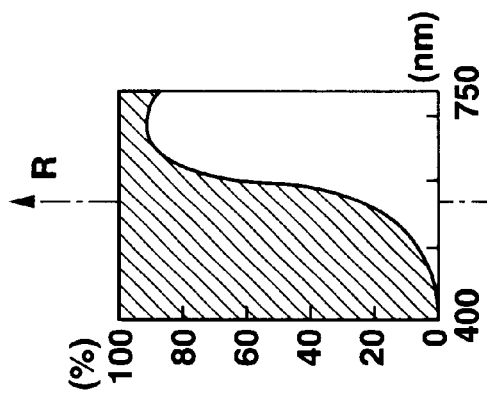
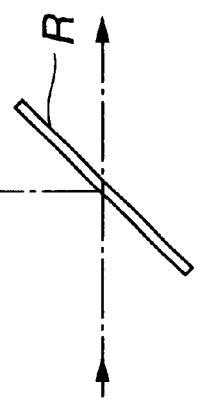
FIG.8(a)
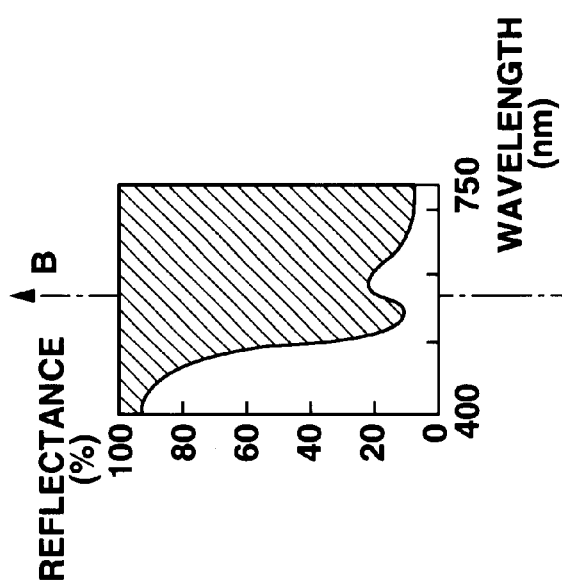
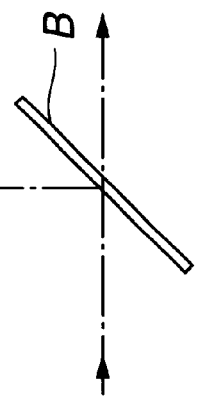

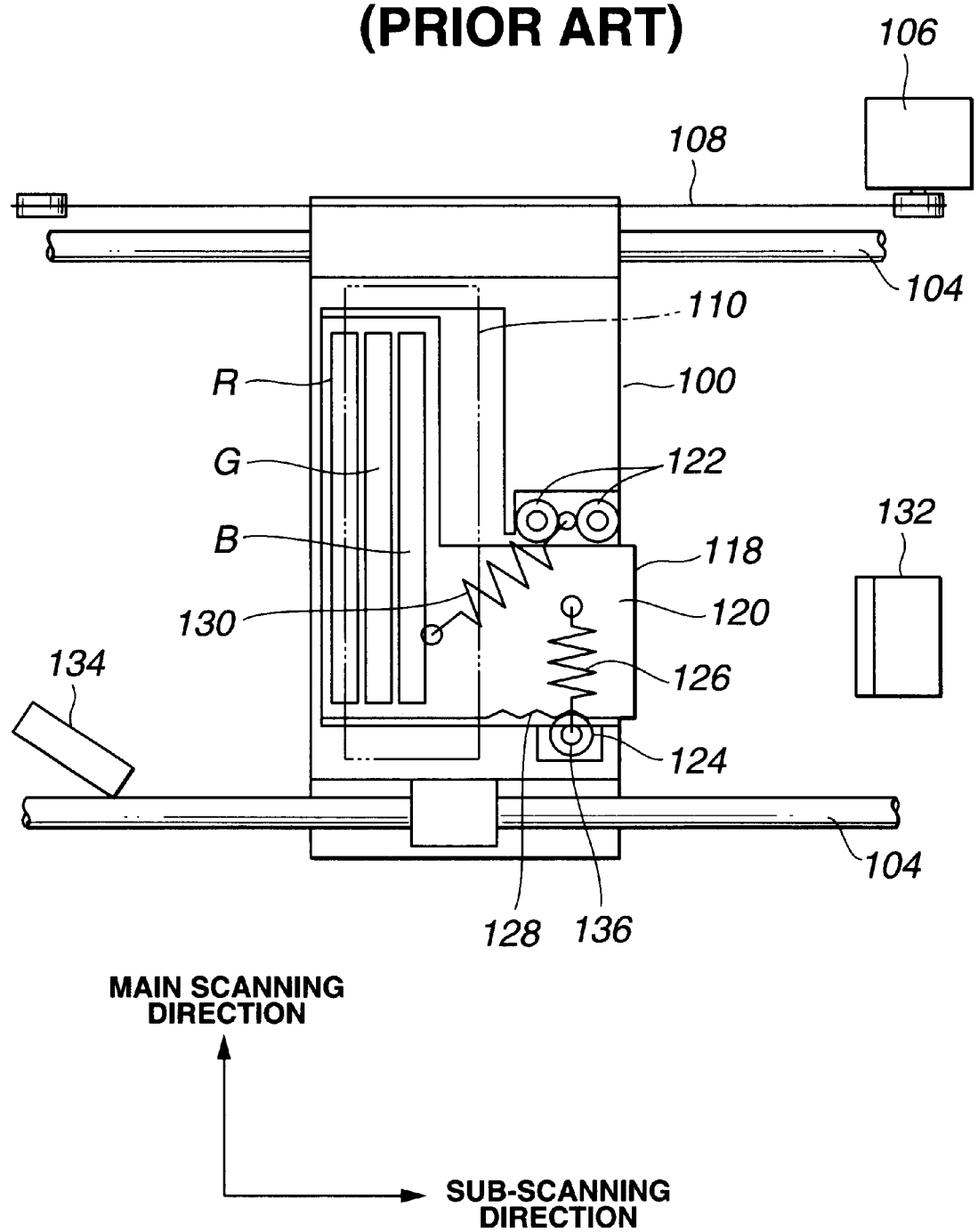

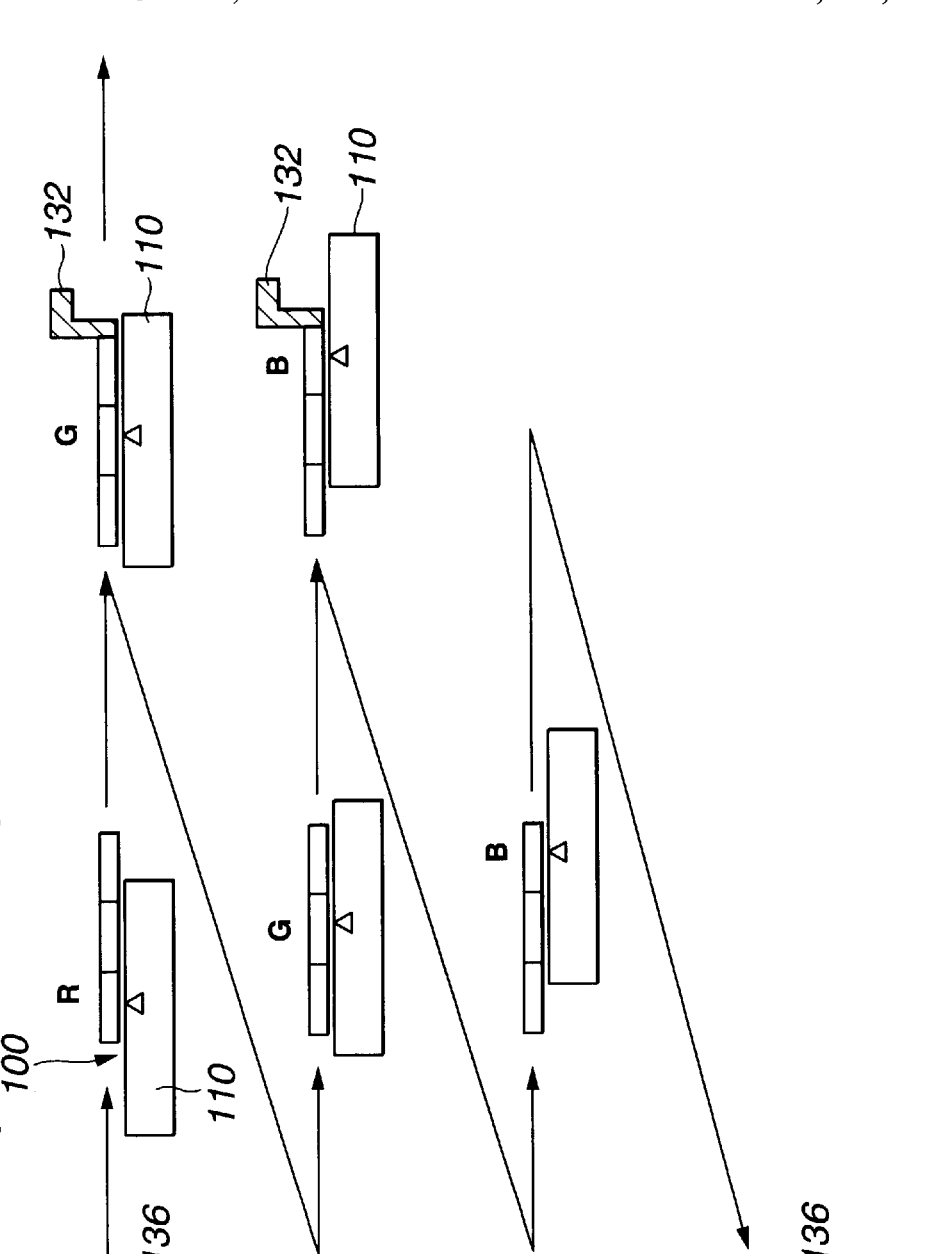
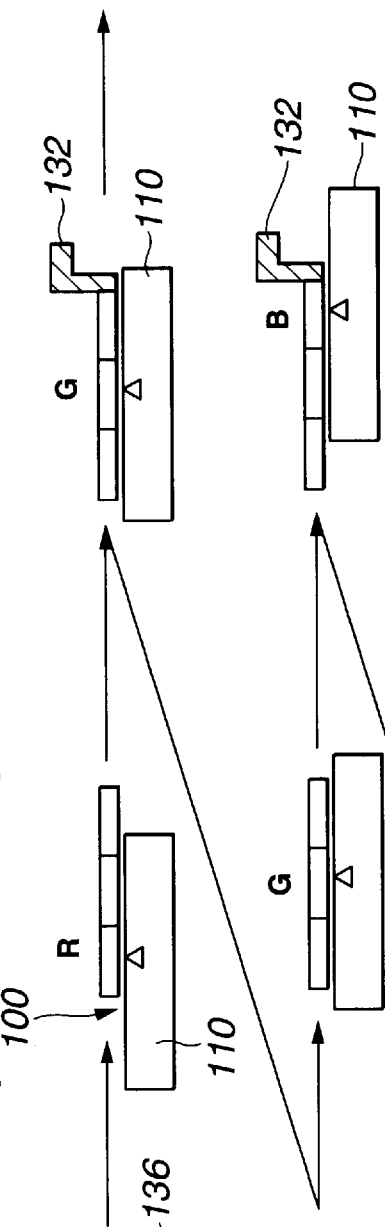
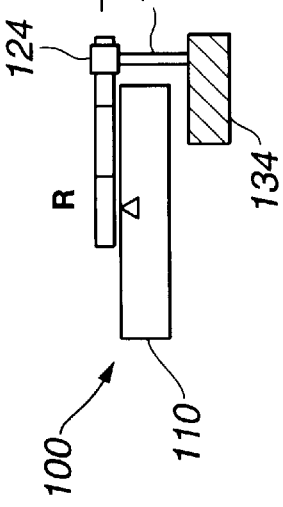
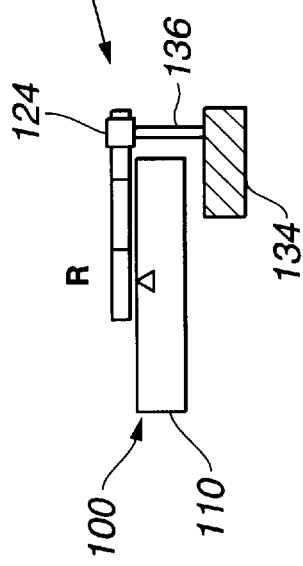
FIG.15(a) (PRIOR ART)
FIG.15(b) (PRIOR ART)
FIG.15(c) (PRIOR ART)

OPTICAL PRINTER

BACKGROUND OF THE INVENTION

1. Field of the Invention

This invention relates to an optical printer used in an optical recording apparatus such as a stationary and portable printer, copying machine and so on. More particularly, this invention relates to an optical printer constructed so as to write to a recording medium by switching plural kinds of filters.

2. Description of the Invention

In general, the optical printer is provided with a light source comprising a number of delicate light emitting dots arranged linearly and is an apparatus for forming a desired image to the recording medium while moving the light source in the direction crossing at right angles the direction of arrangement of the emitting dots to irradiate the recording medium with dotted light. As the light source is used an elements based on a various kinds of principles of light emission, for example, a fluorescent light-emitting tube, LED and so on.

FIG. 13 is a schematic cross-sectional view showing an outline of the construction of an optical printer used in a conventional optical writing apparatus, for example, a portable color printer and so on. FIG. 14 is a plan view showing a print head a part of the construction of which is omitted used in the optical printer.

As shown in FIG. 13, the print head 100 used in the optical printer can move back and forth relative to sub-scanning direction to a film 102 as a recording medium located at a given position. That is to say, as shown in FIG. 14, the print head 100 is guided by a pair of guide shaft 104,104 parallel in the sub-scanning direction and further is connected with a wire 108 driven by a motor 106 to move back and forth in the sub-scanning direction. And, the print head 100 comprises a light emitting element (light source) 110 which has a plurality of light emitting dots arranged in the main scanning direction. The light from the light emitting element 110 passes through filters (R, G, B) as described after and forms an image on a film 102 via a reflecting optical element 112, a life-size optical system 114, a reflecting optical element 116.

As shown in FIG. 13, three filters R, G, and B of red (R), green (G) and blue (B) are located switchably on the side of the light emitting element 110 which is irradiated with light. As shown in FIG. 14, these three filters R, G and B have, respectively, a shape the longer direction of which is the main scanning direction and are in the direction of sub-scanning and mounted to a common frame 118. The frame 118 is provided with a projection 120 for operating a frame. The projection 120 is retained by a guide bearing 122 and a positioning bearing 124. The positioning bearing 124 is forced by a spring 126 and engages with one of three notches formed in the projection 120. The frame 118 is forced by a spring 130 toward a given direction in the direction of sub-scanning. A stopper 132 is provided at a given position on the side of the projection 120 and a reset plate 134 is provided at a given position on the opposite side of the stopper 132 so as to interpose the optical writing head between the stopper 132 and the reset plate 120. That is to say, when the projection 120 of the frame 118 strikes against the stopper 132 with the movement of the print head 100, the frame 118 moves to change and the filters (R, G, B) are switched. And, when the optical writing head 100 moves in the direction opposite to the stopper 132 and the reset plate 134 moves a shaft 136 of the positioning bearing 124, the engagement of the frame 118 by the positioning bearing 124 is released and the frame 118 moves in the direction of the stopper 132 by the spring 130.

Next, a writing operation to the film 102 according to the aforementioned construction is described with reference to FIG. 15. FIG. 15 is a diagram in which the writing operation to the film at the aforementioned print head is illustrated sequentially according to the procedures shown by arrow marks. In FIG. 15, arrangements of longitudinal figures shown in (a), (b) and (c) show a filter reset action, an action from the start to the end of the exposure, and a switching action of the filters (R, G, B) after the exposure, respectively. In FIG. 15, a mark Δ of the light source 110 shows a position of the light emitting dot line. According to this optical writing head 100, an image is color-separated into three primary colors of R G B and a full color image is formed by writing an image of each color to a sheet of film one over the other.

As shown in FIG. 15(a), the reset plate 134 moves the shaft 136 of the positioning bearing 124 to the left with the movement of the optical writing head 100. The frame 118 moves to the right by the spring 130 and is reset at an initial position where the filter R is set at a position where the light emitting element 2 is irradiated with right (mark Δ).

As shown in FIG. 15(b), the optical writing head 100 moves to the right along the direction of sub-scanning in FIG. 15(b). In synchronization with this, the light emitting element 100 is driven by an image signal of R (red). An image of R (red) is formed to the film.

As shown in FIG. 15(c), when the image of R (red) is formed to the film, the projection 120 of the frame 118 strikes against the stopper 132 at the right end in FIG. 15(c) and the frame 118 moves and the filter is switched from R (red) to G (green).

Thereafter, the optical writing head 100 moves to the starting position of exposure on the left side in FIG. 15(a) where reset of the filter is not performed because the reset plate 134 does not contact with the shaft 136 of the positioning bearing 124. And, similarly to the aforementioned (b), the optical writing head 100 moves to the right along the direction of sub-scanning in FIG. 15(b) and, in synchronization with this, the light emitting element 110 is driven by an image signal of G (green) to form an image of G (green) to the film. And, similarly to (c), the projection 120 of the frame 118 strikes against the stopper 132 at the right end in FIG. 15(c) to move the frame 118 and the filter is switched from G (green) to B (blue).

Thereafter, the optical writing head 100 moves to the starting position of exposure on the left side in FIG. 15(a) where reset of the filter is not performed because the reset plate 134 does not contact with the shaft 136 of the positioning bearing 124 by controlling a movement distance of the optical writing head. And, similarly to the aforementioned (b), the optical writing head 100 moves to the right along the direction of sub-scanning in FIG. 15(b) and, in synchronization with this, the light emitting element 110 is driven by an image signal of B (blue) to form an image of B (blue) to the film. And, similarly to (c), while the optical writing head 100 reaches the right end in FIG. 15(a), the filter does not move any more to the left because it has been switched to the extreme left side.

Thereafter the optical writing head 100 moves to the starting position of exposure at (a) on the left side in FIG. 15(a) and the reset plate 134 contacts with the positioning bearing 135 to perform the reset of the filter. Thereby, the filter is set again at R (red).

As above described, in the aforementioned conventional optical printer the optical writing head 100 can move in the direction of sub-scanning to the film 102 located at a given position. And, the optical writing head 100 is constructed so as to switch with moving action the plural kinds of filters (R, G, B) located movably in the direction of sub-scanning.

Accordingly, the aforementioned conventional optical printer requires wide space for moving the optical print head 100.

And, in case of the aforementioned conventional optical printer, the scanning should be performed repeatedly corresponding to the number of the filter (three filters R G B in the aforementioned example) and, therefore, an image can not be formed by one time exposure.

And, in the aforementioned conventional optical printer, the filters are switched by striking the head 100 against the stopper 132 with the action of the movement of the head 100, and on the opposite side the reset is performed by contacting the head 100 to the reset plate 134. Therefore, spatial room is required at both positions for the length obtained by subtracting the width of a sheet of filter from overall width within which the filter moves. That is to say, since three kinds of filters R, G, B are used in this example, spatial room two times and above width in the switching direction of one filter is required for switching and reset.

Further, when the aforementioned conventional optical printer is constructed so as to switch the filter by sliding, there occurs minute dust by a rub between a casing (frame 118) which contains the filter and guides the movement of the casing and the other members and the filter. There has been a disadvantage that the minute dust enters into a light path to cause optically an eclipse which is taken in the film.

And further, since the aforementioned slide-type switching filter has no choice to be located between the light source 110 and the reflecting optical element 112, there has been a disadvantage that the total thickens of the print head 100 is large.

SUMMARY OF THE INVENTION

This invention has its objective to solve the aforementioned disadvantages due to a mobile printer or a slide switchable filter.

An optical printer of this invention is characterized by comprising a light source which emits light, a rotatable optical member which is located in a light path between the aforementioned light source and a recording medium and which selects light having specific wavelength range from the aforementioned light source, a moving means for moving relatively the aforementioned light source or the aforementioned recording medium, and a controlling means for performing synchronously a light emission of the aforementioned light source by an image signal corresponding to the light having the specific wavelength range selected by the aforementioned optical member and rotation of the aforementioned optical member and for forming an image to the aforementioned recording medium by irradiation with light selected by the aforementioned optical member.

BRIEF DESCRIPTION OF THE DRAWINGS

For a more complete understanding of this invention may be had to the following detailed explanations in connection with the accompanying drawings, in which

FIG. 2 is a cross-sectional view showing a rotatable filter part of the first example.

FIG. 6 is a schematic cross-sectional view showing an optical print head equipped with the rotatable filter shown in FIG. 5(d).

FIG. 8 is a graphical representation showing the reflection characteristics of each mirror of a rotatable mirror part of the third example.

FIG. 14 is a plan view showing the optical printer shown in FIG. 13 a part of the construction of which is omitted.

FIG. 15 is an explanatory view showing a writing operation to a film at the optical printer head of the prior art.

DETAILED DESCRIPTION OF THE PREFERRED EMBODIMENTS

Figure 1:
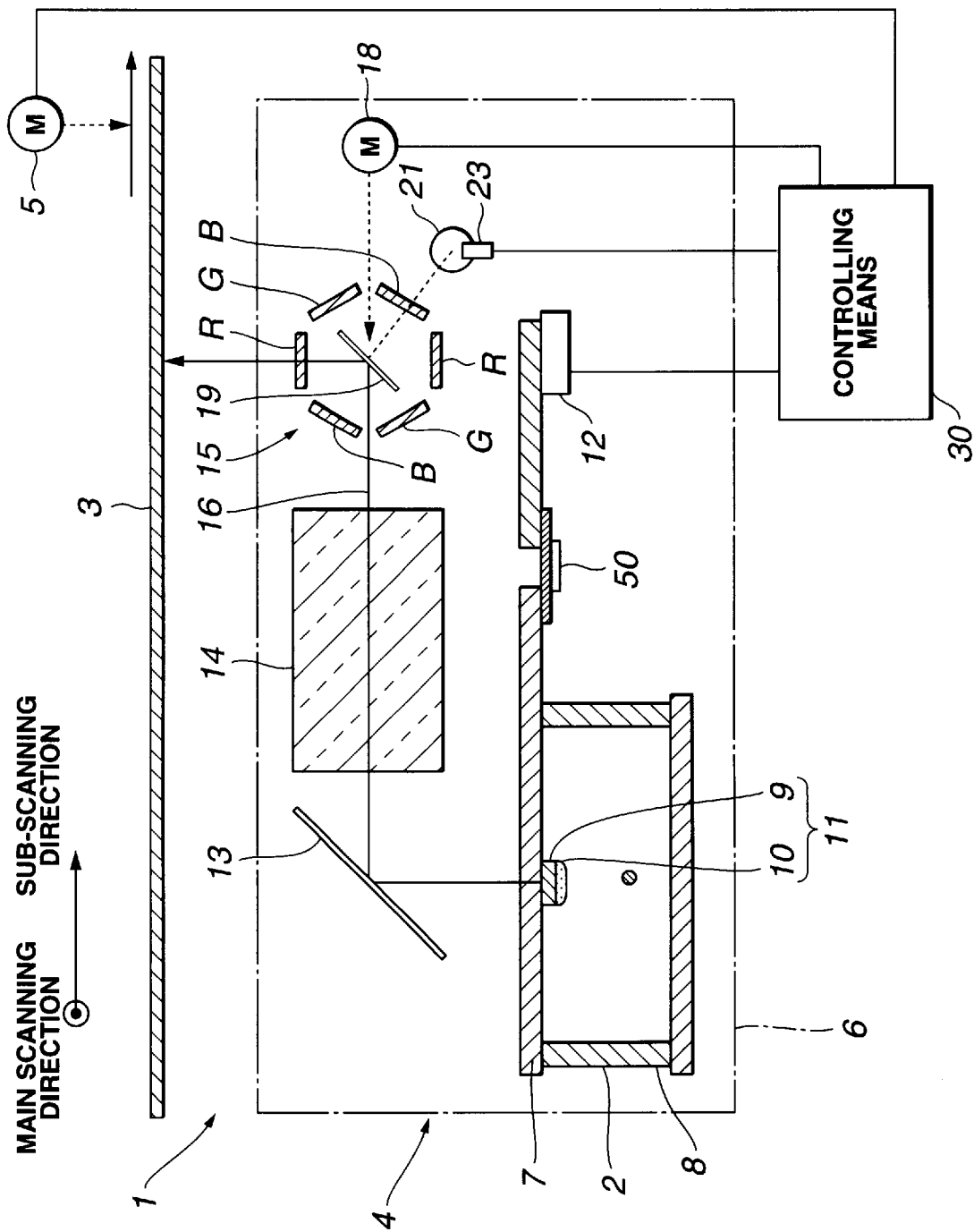
FIG. 1 is a schematic cross-sectional view showing an optical printer of a first example of the working embodiment of this invention.

Referring now to FIGS. 1 and 2, a first example of working embodiment of this invention is described.

An optical printer 1 of the first example comprises a fluorescent light-emitting tube 2 and an optical head 4 equipped with three filters R, G and B which are located substantially in the form of cylinder. The optical print head 4 is located at a given position and a full color image can be formed by moving one time a color film 3 as a recording medium relative to the optical print head 4 along the sub-scanning direction shown by an arrow mark. For example, the optical printer 1 is driven by a digital color image signal obtained from an image-forming apparatus, a digital camera and so on and may be used as a color printer for printing a video image or a digital image to the color film 3.

The optical print head 4 is provided with a motor 5 as a moving means for moving along a direction parallel to a face of a paper shown by a right arrow mark in FIG. 1 (sub-scanning direction). The film 3 can be moved relative to the fluorescent light-emitting tube 2 and so on located at a given position by means of drive of the motor 5.

The optical print head 4 is provided with a foundation 6. The fluorescent light-emitting tube 2 as a light source is mounted to the foundation 6. The fluorescent light-emitting tube 2 is provided with an enclosed container which is formed by bonding a box-type container 8 to a light-penetrating anodic substrate 7 made from glass and so on. An anode 11 comprising a light-penetrating anodic conductor 9 and a fluorescent layer 10 with which the anodic conductor 9 is coated is formed on the anodic substrate 7 in the enclosed container. The anode 11 is a number of light emitting dots arranged in a line or in a zigzag pattern at given spacing along the direction perpendicular to the face of the paper in FIG. 1 (in the direction of main scanning). The film 3 moves along the direction parallel to the face of the paper in FIG. 1 (in the direction of the sub-scanning) shown by the right arrow relative to the fluorescent light-emitting tube 2. The fluorescent light-emitting tube 2 is driven by a driver IC 12 mounted to a circuit substrate.

A fluorescent substance layer 10 of the light-emitting dot of the fluorescent light-emitting tube 2 is a fluorescent substance of ZnO:Zn. Since an emission spectrum of the ZnO:Zn fluorescent substance is extremely wide, three primary colors R, G and B can be taken out by a filter of red, green or blue.

Inside the foundation 6, a reflecting element 13, a life-sized image-forming element 14 and a rotating filter part 15 are located adjacent to the fluorescent light-emitting tube 2 along the direction of sub-scanning to form a light path for leading the light in the form of a dot to the film 3.

The light from the anode 11 (light emitting dot) of the fluorescent light-emitting tube 2 passes through the anodic conductor 9 and the anodic substrate 7 and goes outside along the direction perpendicular to the film 3, which is thereafter reflected at right angles by the reflecting element 13 to generate light parallel in the direction of sub-scanning which enter the rotating filter part 15 via the life-sized image-forming element 14.

The construction of the rotating filter part 15 is described with reference to FIG. 2.

The rotating filter part 15 is provided with two sheets of each of a red filter R having red color as a peak wavelength (for example, 600 nm) of wavelength range of transmitted light, a green filter G having green color as a peak wavelength (for example, 530 nm) of wavelength range of transmitted light, and a blue filter B having blue color as a peak wavelength (for example, 450 nm) of wavelength range of transmitted light. These filters are placed according to the given order to the rotating hollow member 17 so as to constitute each face of regular hexahedron. The space is formed between each filter placed. Accordingly, the filters of the same color are located oppositely so that they are oppositely each other via the rotating shaft of the rotating member 17 and the light can enter from the space between adjacent filters. The rotating member 17 is connected to the motor 18 to rotate at moderate speed in synchronization with the drive of the fluorescent light-emitting tube 2. The fixing member 20 to which the reflecting element 19 is fixed is inserted into the rotating member 17. The reflecting element 19 has the same attitude as that of the aforementioned reflecting element 13 and the attitude of the reflecting element 19 is fixed relative to the rotating filters (R, G, B). The light from the life-sized image-forming element 14 enters inside the rotating member 17 from the space between the filters (R, G, B) and reflected at right angles by the reflecting member 19 to enter the film 3 perpendicularly through the filter (R, G, B).

Figure 3:
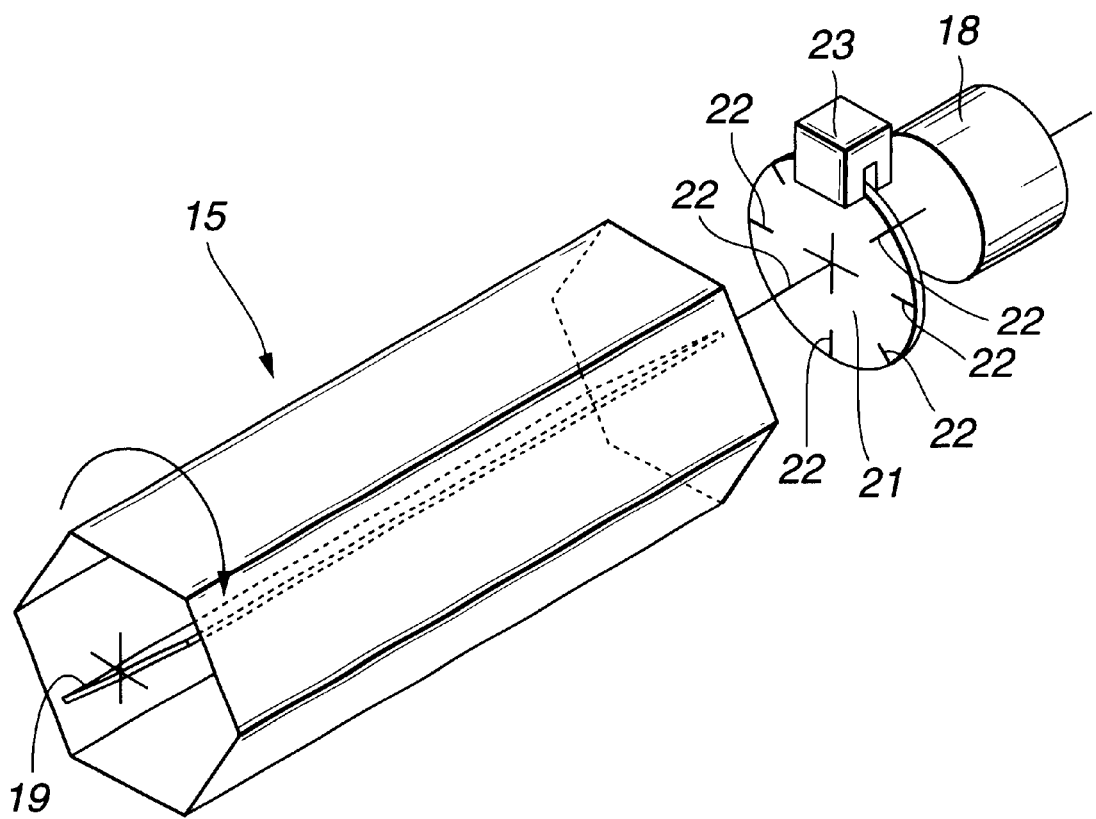
FIG. 3 is a perspective view showing a rotatable filter part of the first example.

As shown in FIGS. 2 and 3, an encoder 21 is mounted to the rotating shaft of the rotating member 17. Radial slits 22 are formed in the encoder 21 at the positions corresponding to six sheets filters (R, G, B) of the rotating member 17, respectively. A photosensor 23 is provided adjacently to the encoder 21. The photosensor 23 comprises a light-emitting part and a light-receiving part which are mounted so as to ride the encoder 21 and detects the slit 22 of the encoder 22 to output a filter position signal. In this example, the position of the origin of the encoder 21 is shown by a certain specific slit. For example, it is not objectionable that only slit 22 corresponding to the R (red) filter is formed more widely than another slits to detect a pulse of broad range generated by the slit 22 corresponding to the R (red) filter to judge the origin.

The optical printer 1 of this example is provided with the controlling means 30 for supervising and controlling the motor 5 as a moving means for the film 3, the motor 18 of the rotating filter part 15, and the driving circuit (driver IC 50) of the fluorescent light-emitting tube 2 connected via the connector 12. The controlling means 30 rotates the rotating filter part 15 by driving the motor 18, and simultaneously, emits light from the fluorescent light-emitting tube 2 by making use of the filter position signal generated from the photosensor 23 and, in synchronization with that, drives the motor 5 as a moving means.

In this example, an image is color-separated into each color of red (R), green (G) and blue (B) and the data constituting the image is used for an image data of each color. The controlling means 30 detects by the filter position signal generated from the photosensor 23 the timing when the specific filter (R, G, B) locates in the light path 16 and drives the fluorescent light-emitting tube 2 on the aforementioned timing by the image signal corresponding to the color of the light transmitted from the aforementioned filters (R, G, B). The light in a state of dot emitted from the fluorescent light-emitting tube 2 passes through the life-sized image-forming element 14 to enter the rotating member 17 from the space between the filters (R, G, B). And, the light is reflected at right angles by the reflecting element 19 in the rotating member 17 and passes through the aforementioned specific filter (R, G, B) located on the light path on the side of the film 3 to enter the film 3 perpendicularly. These operations are carried out in the given order every R G B to irradiate the film 3 with the light. In this example, each filter of each color rotates at 60 degrees and consequently the rotating filter part 15 rotates at 180 degrees in order to write one line in the direction of main scanning to the film 3. The film 3 moves in the direction of sub-scanning and the image is recorded to the whole surface of the film 3 on such timing of irradiation with the light in a state of dot of R G B as intermittent movement of the film 3 every progress of writing of one line and so on. While it is preferable to transfer the film intermittently in the direction of sub-scanning every time the exposure of R G B is completed relative to one line toward main scanning, it is not objectionable to transfer the film continuously if the rotational speed of the rotating filter part is high to carry out the exposure of R G B sufficiently rapidly.

More concretely, for example, when the image is formed at 10 mm/sec by a line head having the resolution of 200 dpi, the time required for one rotation of the rotating filter is 12.7 msec, and when one sheet is used for each filter R G B, the time per one sheet of the filter (per one color) is 4.23 msec. And, the number of rotation is 78.74 rps.

For example, one pulse is detected by the photosensor 23 and the image data of R is outputted to the anode 11 of the fluorescent light-emitting tube 2 to emit a light in harmonization with the rising position of the pulse (output of the photosensor 23, that is to say, the position signal of the filter) and the timing when the light which entered the red filter R enters perpendicularly the film 3. With respect to the image to be emitted after that, it is advisable that the pulse generated at the slit 22 of the encoder 21 is detected every each filter G, B by the photosensor 23 and the fluorescent light-emitting tube 2 may be driven by the image data of G, B on the given timing similarly to the case of red.

It is not objectionable that the encoder 21 is provided with one slit 22 by which an origin signal of the filter position is generated and that the position of each filter is detected by elapsed time after generation of the origin signal to supply an image data corresponding to the color to the fluorescent light-emitting tube 2 on the timing required.

According to this example, the fluorescent light-emitting tube 2 emits light by the image signal of every color of red, green and blue, and the light emitted in a state of dot obtained by each image signal passes selectively through the filter of the corresponding color of the rotating filter part 15 and reflected from the reflecting element 19 of the rotating filter part 15 to reach the film 3. Since the exposure of three colors R G B is performed at the same time, a full color image can be formed by one time movement of the film 3. Since the film 3 moves, spatial room is not required for movement of the optical print head 4. While a plurality of filters is used, spatial room is not required to slide the filter because the plurality of filters is switched by not sliding but rotating. And, a problem of dust occurred by friction between the filter and the case can be avoided. While the slide-switching filter should be located between the optical system (the reflecting element 13, life-sized image-forming element 14) and the fluorescent light-emitting tube 2, the rotating filter part 15 of this example can be located in configuration space of the optical system which has been conventionally used.

Figure 4:
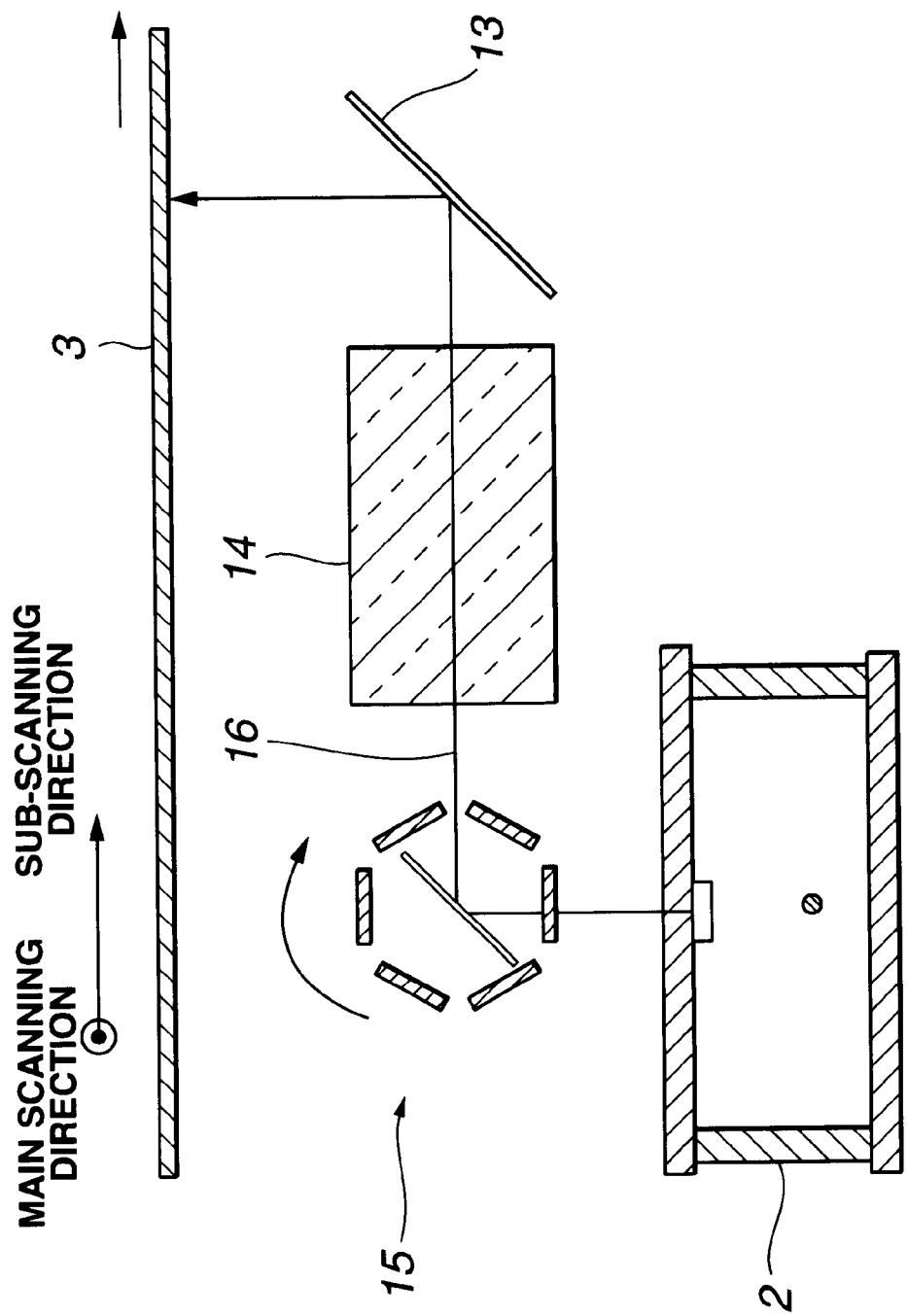
FIG. 4 is a schematic cross-sectional view showing an optical printer of a second example of the working embodiment of this invention.

In the first example as described above, while the rotating filter part 15 is located behind the life-sized image-forming element 14 (on the side of the film 3) in the direction of irradiation with light, it is not objectionable to locate it at any position on the light path between the fluorescent light-emitting tube 2 and the film 3. For example, as shown by the second example of the working embodiment of this invention shown in FIG. 4, the rotating filter part 15 may be located between the fluorescent light-emitting tube 2 and the life-sized image-forming element 14. In the second example shown in FIG. 4, the constitution except the position of the rotating filter part 15 is the same as that in the first example.

In the first example as described above, while the light passes through the filter (R, G, B) after it is reflected at the rotating filter part 15, such construction may be adopted that the light passes through the filter (R, G, B) and is then reflected to enter the film 3, or such construction may be adopted that the light passes through the filter (R, G, B) and then passes through again the filter (R, G, B) to enter the film 3. A filter to be used is not only a color filter (a wavelength-selecting filter, but also a ND (neutral density) filter for controlling the transmittance.

FIG. 5 is a view showing examples of another construction of the rotating filter of this invention and is a cross-sectional view taken along a cutting line crossing rectangularly the rotating shaft. The shape of the rotating member holding the filter may be a hollow body (cylindrical body) the cross section of which is a polyhedron of regular hexahedron and above (at least regular trihedron) in case where the reflecting element (mirror) is built-in and the light path is curved at right angles as shown in FIGS. 5(a), (b). For example, in case where the rotating member 32 the cross section of which is an octahedron shown in FIG. 5(a), four sheets of filter, that is, two sheets of the red filter R, one sheet of the green filter G and one sheet of the blue filer B are used so as to compensate the lack of amount of light. While, in general, the ZnO:Zn fluorescent used in the fluorescent light-emitting tube 2 has a wide spectrum, there are many cases where intensity of light in red range is running short somewhat. In such cases, if the number of the red filter R to be used is increased more than that of another filter to prolong the exposure time of red at the exposure of one line, a color image having good color balance can be obtained.

Figure 5A:
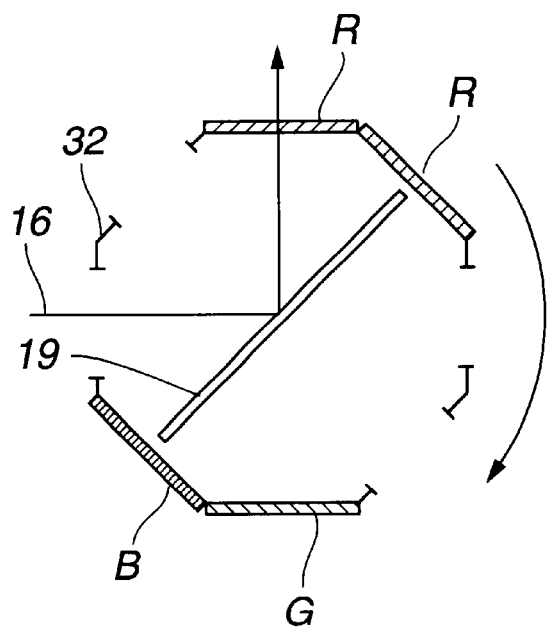
FIG. 5 is a cross-sectional view showing another example of the construction of the rotatable filter part of this invention.
Figure 5C:
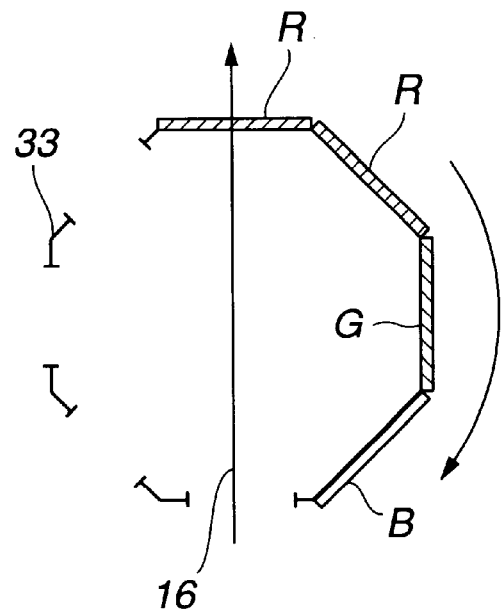
Figure 5B:
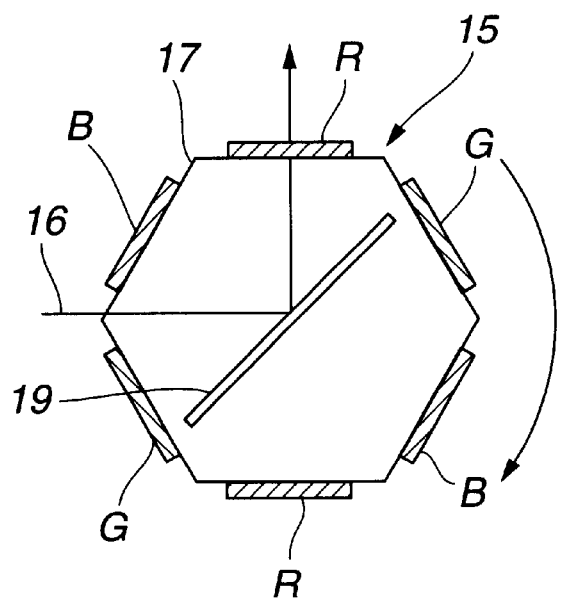
Figure 5D:
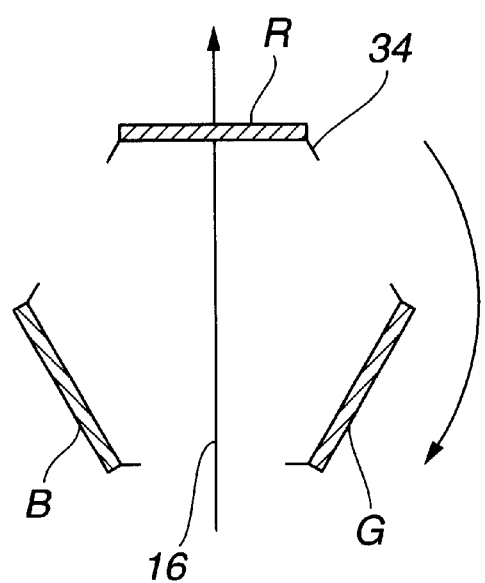

FIGS. 5(c), (d) show examples in which the reflecting elements (mirror) are not built in the rotating member 33, 34 but the light path 16 is a straight line. Both of examples are constructed so that openings are formed on the side opposite to the filter (R, G, B) and an incident light passes through the filter (R, G, B) to come out. FIG. 6 shows an example of the construction of the optical print head equipped with the rotating filter part shown in FIG. 5(d). In the example shown in FIG. 6, the film 3 is arranged at a position crossing rectangularly the light path of the life-sized image-forming element 14.

Figure 7:
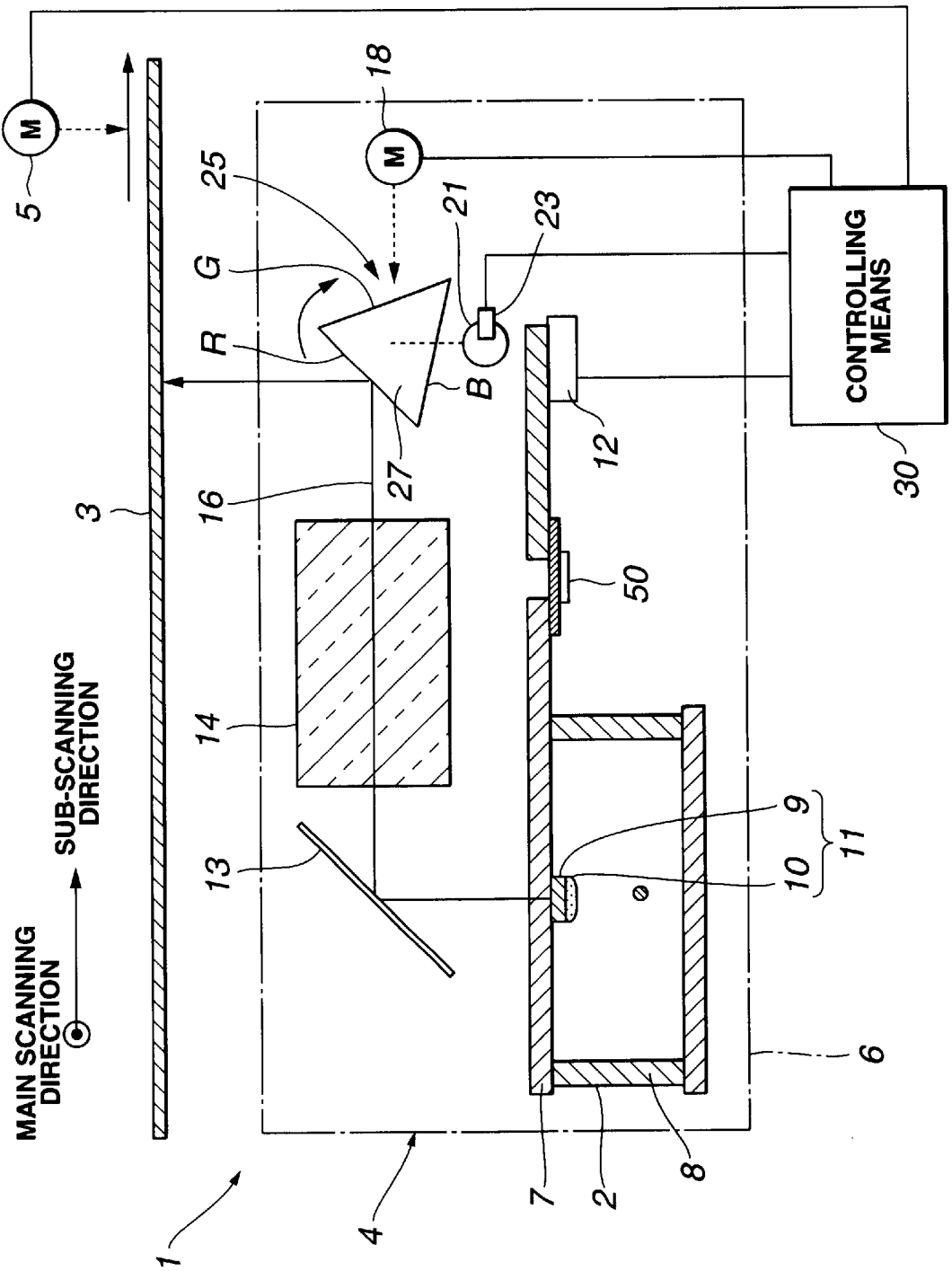
FIG. 7 is a schematic cross-sectional view showing a third example of the working embodiment of this invention.

Referring now to FIGS. 7 and 8, the third example of the working embodiment of this invention is described.

The optical printer 1 of the third example comprises the optical print head 4 equipped with the fluorescent light-emitting tube 2 as a light source and three rotating mirrors R, G, B which are arranged substantially in a form of triangular tube. This optical print head 4 is located at the given position, and a full color image can be formed by moving the color film 3 as a recording medium one time in the direction of sub-scanning shown by the arrow mark relative to the optical print head 4. For example, this optical printer 1 is driven by the digital color image signal obtained from the image-forming apparatus and is used as a color printer for printing the image to the color film 3.

The optical print head 4 is provided with the motor 5 as a moving means for moving the film 3 as a recording medium in the direction parallel to the face of the paper (in the direction of subscanning) shown by the arrow mark in FIG. 7. By means of the drive of the motor 5, the film 3 can be moved relative to the fluorescent light-emitting tube 2 set at the given position.

The optical print head 4 is provided with the foundation 6 set at the given position. The foundation 6 is provided with the fluorescent light-emitting tube 2 as a light source. The fluorescent light-emitting tube 2 is provided with an enclosed container which is formed by bonding a box-type container part 8 to the glass-made anodic substrate 7. The anode 11 comprising the anodic conductor 9 and the fluorescent layer 10 with which the anodic conductor 9 is coated is formed on the anodic substrate 7 in the enclosed container. The anode 11 is a number of emitting dots which are arranged in line or zigzag pattern at the given spacing in the direction rectangular to the face of the paper (in the direction of main scanning) in FIG. 7. The film 3 moves in the direction parallel to the face of the paper shown by the right arrow mark in FIG. 7 (in the direction of sub-scanning) relative to the fluorescent light-emitting tube 2. The fluorescent light-emitting tube 2 is driven by the driver IC 12 mounted on the circuit substrate.

The fluorescent layer 10 of the emitting dot of the fluorescent light-emitting tube 2 is a ZnO:Zn fluorescent substance. Since the emitting spectrum of the ZnO:Zn fluorescent substance has an extremely wide range, three primary colors R, G, B can be taken out by three kinds of mirrors each of which reflects only light of each color of red (R), green (G), blue (B).

The reflecting element 13 and the life-sized image-forming element as well as the rotating mirror part 15 are located adjacent to the fluorescent light-emitting tube 2 in the direction of sub-scanning in the foundation 6 and the path 16 for leading the light in a state of dot to the film 3 is formed.

The light emitted from the anode 11 (emitting dot) of the fluorescent light-emitting tube 2 passes through the anodic conductor 9 and the anodic substrate 7 to come out in the direction rectangular to the film 3. Thereafter, it is reflected at right angles from the reflecting element 13 and converted to light parallel to the direction of sub-scanning to enter the rotating mirror part 15 via the life-sized image-forming element 14.

Figure 9:
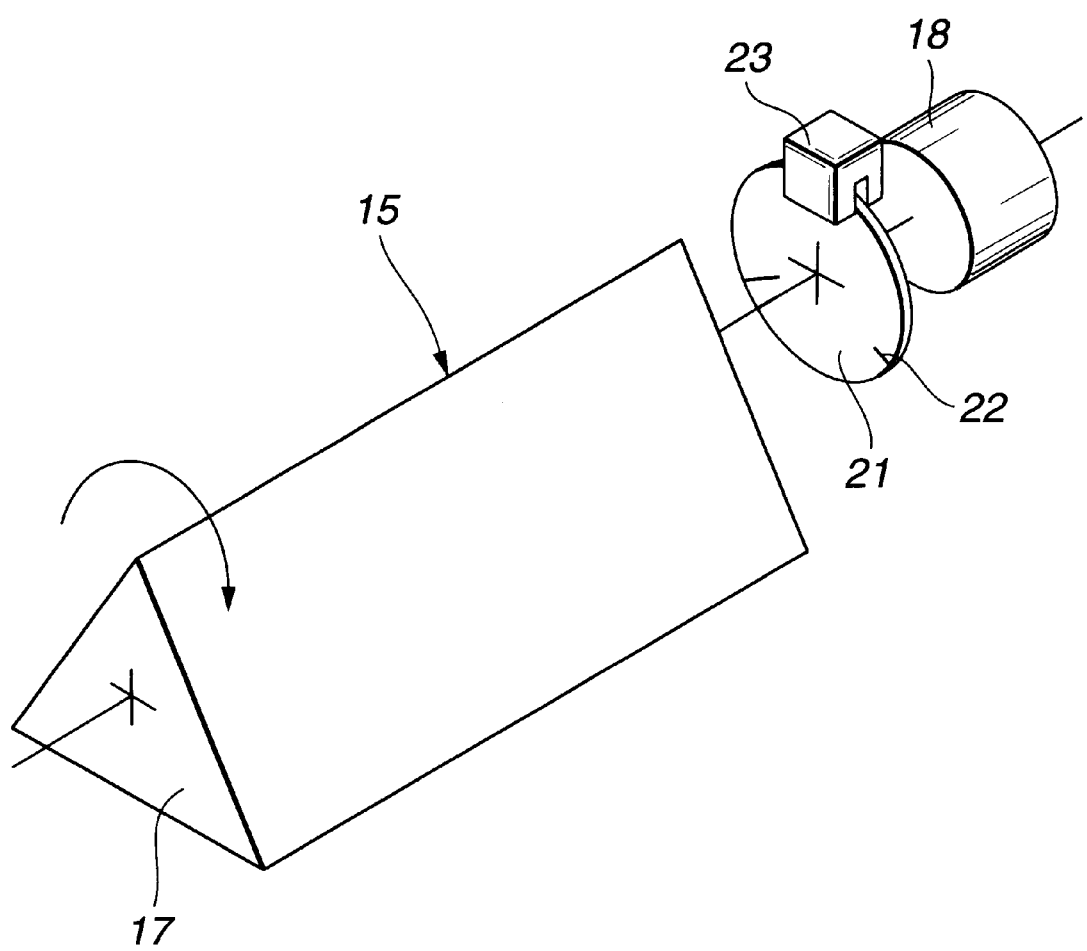
FIG. 9 is a perspective view showing a driving mechanism of the rotatable mirror part of the third example.

Referring now to FIGS. 7 to 9 the construction of the rotating mirror part 15 is described.

The rotating mirror part 15 is provided with a sheet of a red mirror R the peak wavelength of the reflected wavelength range of which is red (for example 500 nm), a sheet of a green mirror G the peak wavelength of the reflected wavelength range of which is green (for example 530 nm), and a sheet of a blue mirror the peak wavelength of the reflected wavelength range of which is blue (for example 450 nm). The relationship between the reflectance and the wavelength of these mirrors is shown in a graph of FIG. 2.

These mirrors are dichroic mirrors which are constructed by forming a dichroic filter to a glass plate. A non-metallic multi-layer of the visible region exhibits an extreme interference color and has spectral characteristics in which reflected light and transmitted light are different from each other. This is called "dichroic filter" and is used as a half-mirror for a special objective. Each mirror of this example can be constructed by dividing the visible region into three R G B and by bringing three colors close optimum colors.

Each mirror is mounted in the predetermined order to the openings formed on three faces of the rotating member 17, a hollow regular triangular tube. The rotating member 17 is connected to the motor 18 and rotates at moderate speed in synchronization with the drive of the fluorescent light-emitting tube 2. The light from the life-sized image-forming element 14 is reflected from the mirror (R, G, B) to enter rectangularly the film 3. Since the component of the light beyond the reflected wavelength region of each mirror passes through the mirror, it does not reach the film.

As shown in FIGS. 7 and 9, the encoder 21 is mounted to the rotating shaft of the rotating member 17. Radial slits 22 are formed to the encoder 21 at the position corresponding to three sheet of mirrors (R, G, B), respectively. The photosensor 23 is mounted adjacently to the encoder 21. The photosensor 23 comprises the light-emitting part and the light-receiving part which are mounted so as to ride the encoder 21 and detects the slit 22 of the encoder 21 to output the mirror position signal.

The optical printer 1 of this example is provided with the controlling means 30 for supervising and controlling the motor 5 as a moving means for the film 3, the motor 18 of the rotating mirror part 16 and the driving circuit (driver IC 50) for the fluorescent light-emitting tube 2 connected via the connector 12. This controlling means 30 drives the motor 18 to rotate the rotating mirror part 15, and simultaneously, makes the fluorescent light-emitting tube 2 emit light by making use of the mirror position signal from the photosensor 23, and further, in synchronization with that, drives the motor 5 as a moving means.

In this example, the image is color-separated into each color of red (R), green (G), blue (B), and the data constituting the image is used as image data every each color. The controlling means 30 detects by the mirror position signal from the photosensor 23 the position where the specific mirror (R, G, B) can reflect rectangularly the light from the life-sized image-forming element 14. That is to say, at the position, the light from the life-sized image-forming element 14 enters the mirror at angle of incidence of 45 degrees and the light path 16 is curved rectangularly upward to reach the film. The controlling means 30 detects the timing where the specific kind of mirror (R, G, B) reaches such position and drives the fluorescent light-emitting tube 2 on the aforementioned timing by the image signal of color corresponding to the reflected color of the mirror (R, G, B). The light in a state of dot from the fluorescent light-emitting tube 2 passes through the life-sized image-forming element 14 and is reflected at right angles from the mirror (R, G, B) to enter rectangularly the film 3. This operation is carried out in the predetermined order every R G B to irradiate the film 3 so as to lay one on top of another. In this example, each mirror rotates by every 120 degrees in order to write one line toward the main scanning to the film 3. The film 3 moves in the direction of sub-scanning and the image is recorded on the whole surface of the film 3 on such timing of irradiation with the light in a state of dot of R G B as intermittent movement of the film 3 every progress of writing of one line and so on. While it is preferable to transfer the film intermittently in the direction of sub-scanning every time the exposure of R G B is completed relative to one line toward main scanning, it is not objectionable to transfer the film continuously if the rotational speed of the rotating filter part is high to carry out the exposure of R G B sufficiently rapidly.

More concretely, for example, when an image is formed at a rate of 10 mm/sec by a line head having the resolution of 200 dpi, the time required for one rotation of the rotating filter is 12.7 msec, and when one sheet is used for each filter R G B, the time per one sheet of the filter (per one color) is 4.23 msec. And, the number of rotation is 78.74 rps.

For example, one pulse is detected by the photosensor 23 and the image data of R is outputted to the anode 11 of the fluorescent light-emitting tube 2 to emit a light in harmonization with the rising position of the pulse (output of the photosensor 23, that is to say, the position signal of the mirror) and the timing when the light which entered the red mirror R enters perpendicularly the film 3. With respect to the image of G, B to be emitted after that, it is advisable that the pulse generated at the slit 22 of the encoder 21 is detected every each mirror G, B by the photosensor 23 and the fluorescent light-emitting tube 2 may be driven by the image data of G, B on the given timing similarly to the case of red.

It is not objectionable that the encoder 21 is provided with one slit 22 by which an origin signal of the mirror position is generated and that the position of each mirror is detected by elapsed time after the generation of the origin signal to supply an image data corresponding to the color on the timing required to the fluorescent light-emitting tube 2.

According to this example, the fluorescent light-emitting tube 2 emits light by the image signal of every color of red, green and blue, and the light emitted in a state of dot obtained by each image signal is reflected selectively by the mirror (R, G, B) of the corresponding color of the rotating mirror part 15 to reach the film 3. Since the exposure of three colors R G B is performed every line, a full color image can be formed by moving the film 3 one time over the whole length toward sub-scanning. Since the film 3 moves, it is not necessary to form spatial room for movement of the optical print head 4. While a plurality of mirrors is used in this example, spatial room is not required to slide the mirror because a plurality of mirrors is switched by not sliding but rotating. And, while it is assumed that there is a problem that there occurs dust because of friction between the mirror and a case in case of a slide-switching type mirror, such problem can be avoided in this example because of being rotating-type. While the slide-switching mirror should be located between the optical system (the reflecting element 13, life-sized image-forming element 14) and the fluorescent light-emitting tube 2, the rotating-type mirror part 15 of this example can be located in configuration space of the optical system which has been conventionally used such as adjacent portion on the optical axis of the life-sized image-forming element 14 and so on.

Figure 10:
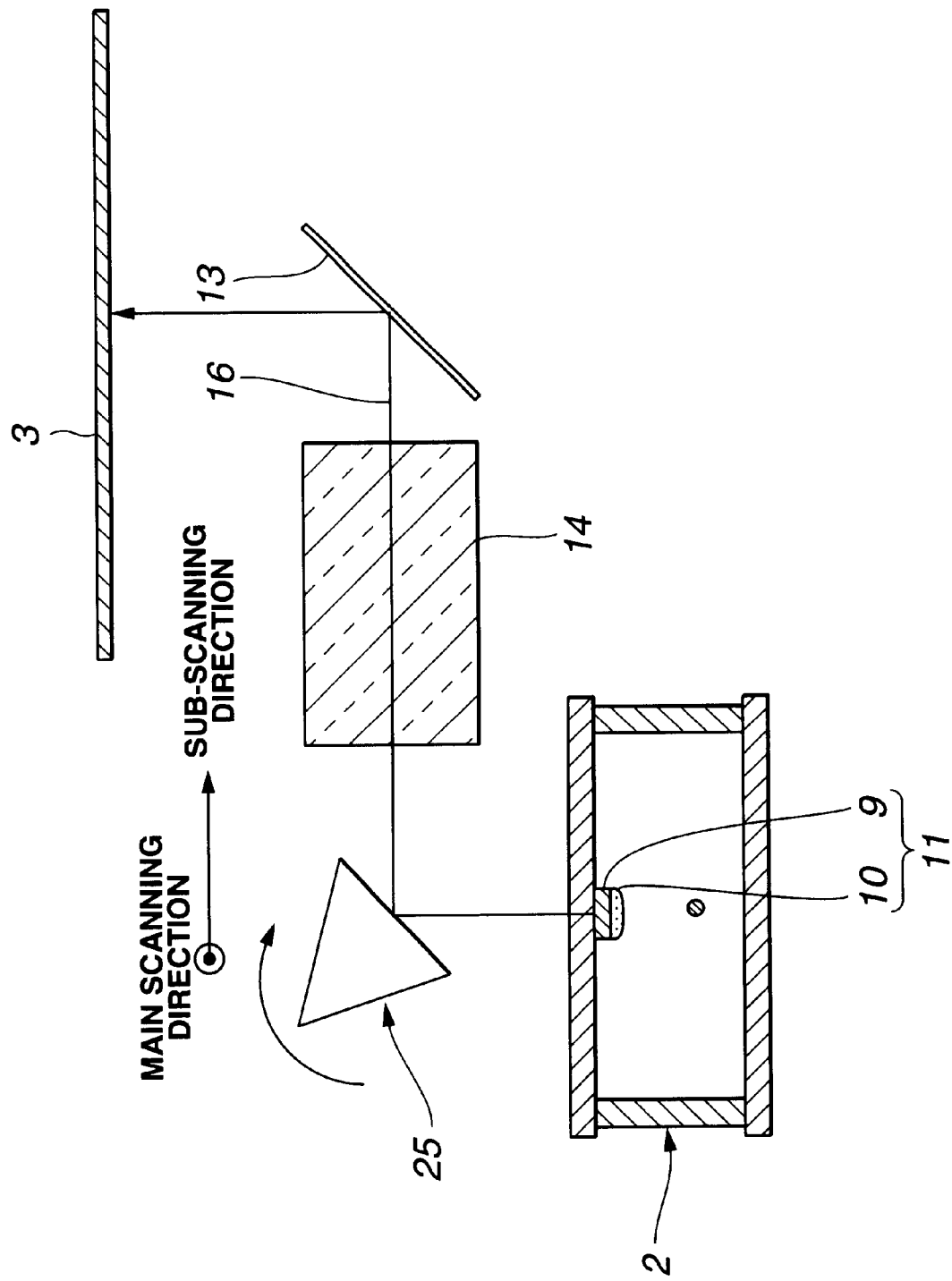
FIG. 10 is a schematic cross-sectional view showing a fourth example of the working embodiment of this invention.

In the third example as described above, while the rotating mirror part 15 is located behind the life-sized image-forming element 14 (on the side of the film 3) relative to the direction of irradiation with the light, it may be located at any position on the light path between the fluorescent light-emitting tube 2 and the film 3. For example, as the fourth example of the working embodiment of this invention shown in FIG. 10, it may be located between the fluorescent light-emitting tube 2 and the life-sized image-forming element 14. In the second example shown in FIG. 4, the construction except the position of the rotating mirror part 15 is the same as that of the first example.

Figure 11A:
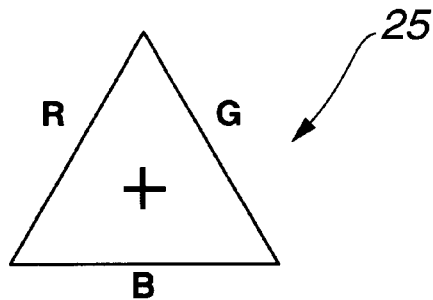
FIG. 11 is a side view showing an example of the construction of the rotatable mirror part of this invention.
Figure 11B:
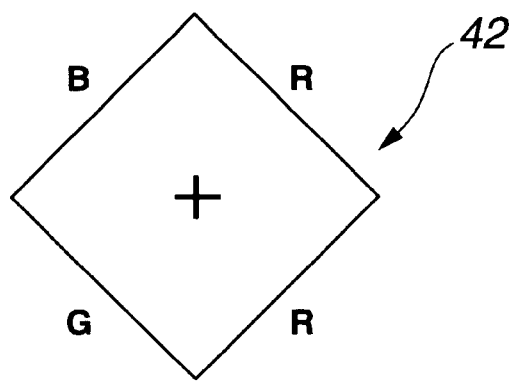
Figure 11C:
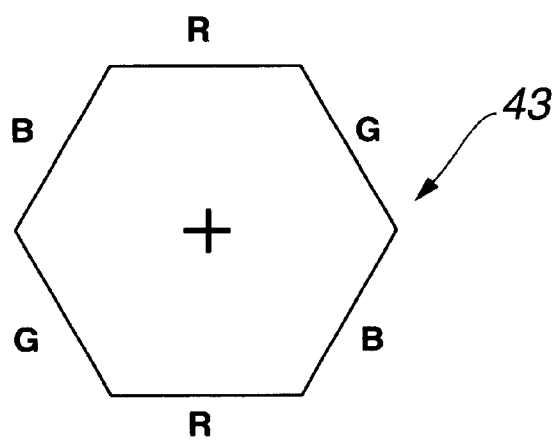

FIG. 11 is a view showing an example of the construction of the rotating mirror part of this invention and is a side view observed from the direction parallel to the rotating shaft. An arrangement of plural kinds of mirrors may be regular polyhedron (regular polyhedral tube). The width of each mirror may be nearly the emitting dot of the fluorescent light-emitting tube (anode) (for example, approximately 80 $\mu$m) FIG. 11(a) shows the rotating mirror part 15 comprising three sheet of mirrors R G B arranged in a form of regular trihedral tube of the aforementioned first example. They may be arranged in a form of regular square pole like the rotating mirror part 32 shown in (b). In that case, four sheets of mirrors are used in all, that is to say, two sheets of red mirror R, one sheet of each green mirror G and blue mirror B, so as to compensate for the lack of the amount of light. While the ZnO:Zn fluorescent used in the fluorescent light-emitting tube 2 has generally a wide spectrum, there are many cases where it is lacking slightly in the intensity of light in the red region. In such cases, if the number of the red mirror R used is increased as shown in (b) to prolong the exposure time of red at exposure of one line, a color image of good color balance can be obtained. The mirrors may be arranged in a form of regular hexahedral tube like the rotating mirror part 33 as shown in (c). In this case, two sheets of each mirror R G B are arranged in the predetermined order.

Figure 12:
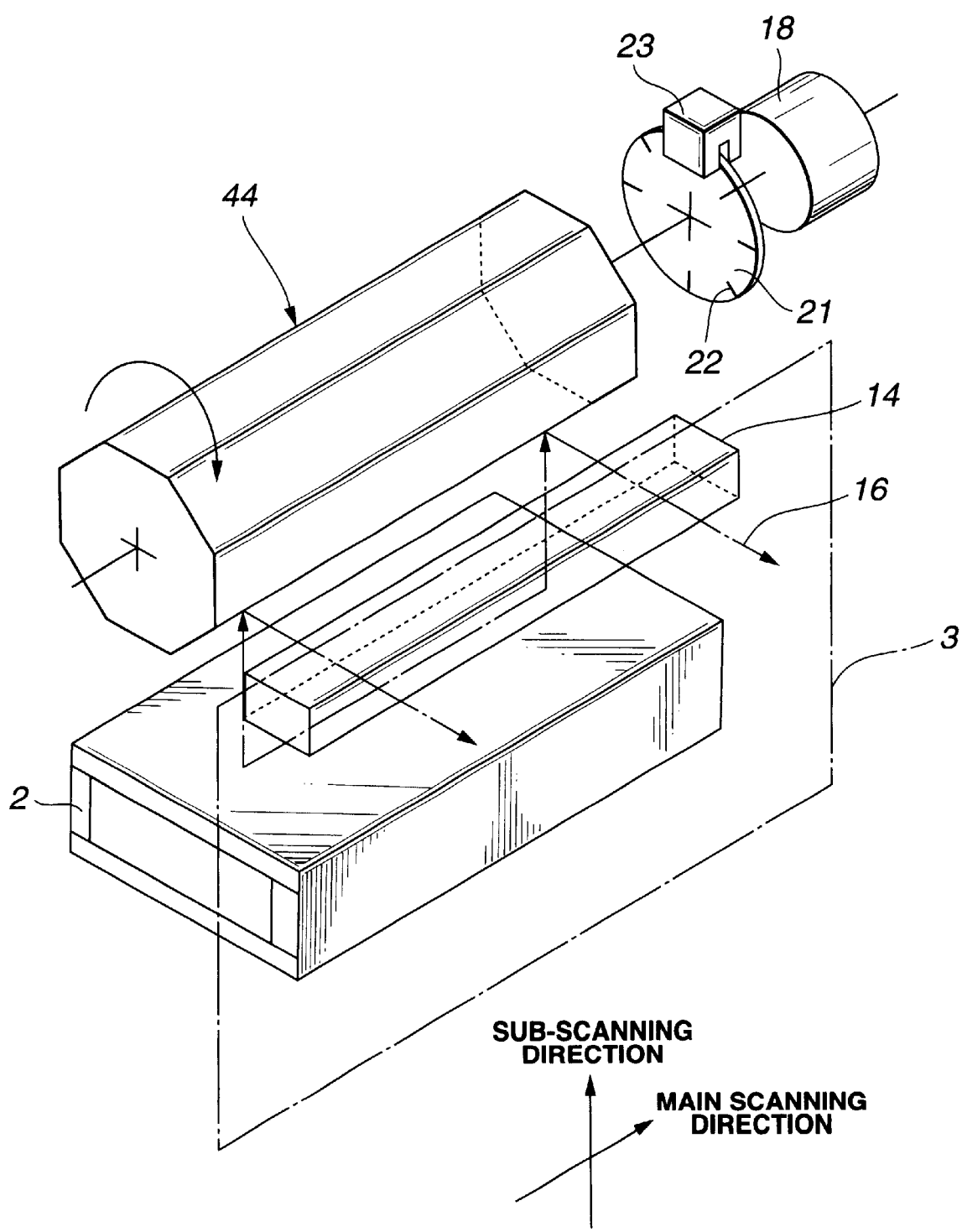
FIG. 12 is a schematic cross-sectional view showing a fifth example of the working embodiment of this invention.
Figure 13:
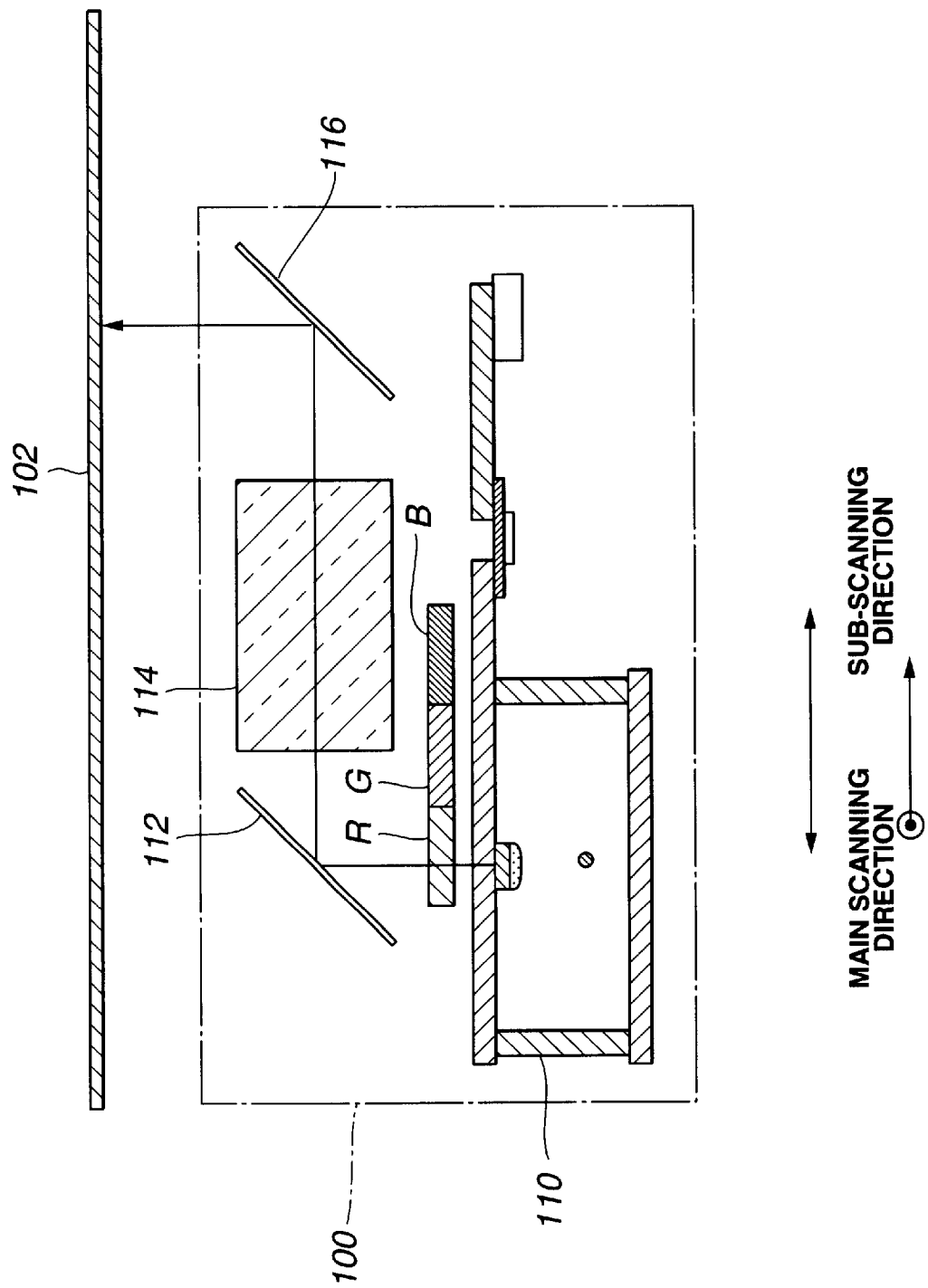
FIG. 13 is a schematic cross-sectional view showing an outline of the construction of an optical printer of a prior art.

FIG. 12 shows the optical print head which reflects at right angles the light from the fluorescent light-emitting tube 2 at the rotating mirror in a form of regular octahedral tube and leads the light directly to the film 3 via the life-sized image-forming element 14. This example is the case where the reflecting element 13 is removed from the optical print head shown in FIG. 10 and the film 3 is arranged in the position crossing at right angles the optical axis of the life-sized image-forming element 14.

While the optical print head is fixed and the film is moved in each example as described above, conversely, it is not objectionable to move the optical print head relative to the film. In the latter case, while there is no advantage of spatial room by fixation of the optical print head, an advantage can be obtained by the use of the rotating filter part or mirror part instead of the slide-switching type-filter or mirror.

While the light source is the fluorescent light-emitting tube in the examples described above, may be used a light source having wavelength of R, G, B (400~750 nm), for example, light source using another principle of light emission such as FED, LED, EL, PDP, PLZT shutter+light source, LCD shutter+light source and so on. And, while the shape of the rotating member holding the filter of the rotating filter part is polyhedron, a cylinder may be also used. The filter mounted to the cylindrical rotating member may be in a form of a plate or in a form of a curved surface conformable with a cylindrical peripheral surface.

While the optical filter is used as a filter in the examples described above, may be used a color changing mediums, for example, Styry 17 (Kodak).

According to the optical print head or optical printer of this invention, since a plurality of filters or dichroic mirrors which is arranged so that the light from the light source passes selectively through a plurality of filters or dichroic mirrors to rotate is provided in the optical print head for forming the image to the recording medium by irradiation with the light in a form of dot from the light source, the aforementioned problems can be solved and the aforementioned objectives can be achieved.

That is to say, the exposure can be completed by one time relative movement between the head and the recording medium by making the light emit light while switching the filter or the mirror by rotation.

According to this invention, there is required no room for moving the head which has been required by fixing the head to move the recording medium, and there is required no spatial room toward the slide of the filter or mirror differently from the slide-switching type-filter or mirror of conventional art.

According to this invention, the entire apparatus can be minimized more smaller that of conventional art by these characteristics in construction.

According to this invention, since the head is fixed, nonuniformity in print by shocks from the outside does not occur.

According to this invention, since the filter is switched by a smooth rotating action, there occurs scarcely dust in a sliding section differently from the conventional constructions. Therefore, a problem that dust enters the optical path which is taken in the film can be solved.

What is claimed is:

1. An optical printer comprising:
   a light source which emits light;
   a rotatable optical member which is located in a light path between said light source and a recording medium and which selects light having a specific wavelength range from said light source;
   a moving means for moving relatively said light source or said recording medium; and
   a controlling means for performing synchronously a light emission of said light source by an image signal corresponding to light having the specific wavelength range selected by said optical member and rotation of said optical member and for forming an image to said recording medium by irradiation with light selected by said optical member,
   wherein the rotatable optical member comprises a plurality of filters and slits alternately arranged on a circumferential surface of a rotatable cylindrical drum, and
   wherein the light source comprises a fluorescent light-emitting tube having light emitting dots arranged at given spacings.

2. An optical printer described in claim 1, wherein the circumferential surface of the rotatable cylindrical drum comprises a polyhedral shape.

3. An optical printer described in claim 1, further comprising a reflecting element disposed within the rotatable optical member for reflecting the light passing through the respective slit from said light source to the respective filter corresponding to the light having specific wavelength.

4. An optical printer described in claim 1, wherein said plurality of filters comprise a red filter having a peak wavelength in a wavelength range of transmitted light which is a red color, a green filter having a peak wavelength in a wavelength range of transmitted light which is a green color, and a blue filter having a peak wavelength in a wavelength range of transmitted light which is a blue color.

5. An optical printer described in claim 1, wherein said recording medium is movable relative to said light source, said light source is made to emit a light by plural types of image signals generated corresponding to the same type of said plurality of filters, and simultaneously, in synchronization with that, said plurality of filters are rotated and an image is formed to said recording medium by moving said recording medium relative to an irradiation with light transmitted selectively through said plurality of filters.

6. An optical printer described in claim 1, wherein said light source is movable relative to said recording medium, said light source is made to emit a light by plural types of image signals generated corresponding to the same type of said plurality of filters, and simultaneously, in synchronization with that, said plurality of filters are rotated and an image is formed to said recording medium by moving said light source while irradiating with the light transmitted selectively through said plurality of filters.

7. An optical printer comprising:
   a light source configured to emit light;
   a rotatable optical member which is located in a light path between said light source and a recording medium and configured to select light having a specific wavelength range from said light source;
   a motor configured to move relatively said light source or said recording medium; and
   a controller configured to synchronously perform a light emission of said light source by an image signal corresponding to light having the specific wavelength range selected by said optical member and to rotate said optical member, so as to form an image to said recording medium by irradiation with light selected by said optical member,
   wherein the rotatable optical member comprises a plurality of filters and slits alternately arranged on a circumferential surface of a rotatable cylindrical drum, and
   wherein the light source comprises a fluorescent light-emitting tube having light emitting dots arranged at given spacings.

8. An optical printer described in claim 7, wherein the circumferential surface of the rotatable cylindrical drum comprises a polyhedral shape.

9. An optical printer described in claim 7, further comprising a reflecting element. disposed within the rotatable optical member and configured to reflect the light passing through the respective slit from said light source to the respective filter corresponding to the light having specific wavelength.

10. An optical printer described in claim 7, wherein said plurality of filters comprise a red filter having a peak wavelength in a wavelength range of transmitted light which is a red color, a green filter having a peak wavelength in a wavelength range of transmitted light which is a green color, and a blue filter having a peak wavelength in a wavelength range of transmitted light which is a blue color.

11. An optical printer described in claim 7, wherein said recording medium is movable relative to said light source, said light source is made to emit a light by plural types of image signals generated corresponding to the same type of said plurality of filters, and simultaneously, in synchronization with that, said plurality of filters are rotated and an image is formed to said recording medium by moving said recording medium relative to an irradiation with light transmitted selectively through said plurality of filters.

12. An optical printer described in claim 7, wherein said light source is movable relative to said recording medium, said light source is made to emit a light by plural types of image signals generated corresponding to the same type of said plurality of filters, and simultaneously, in synchronization with that, said plurality of filters are rotated and an image is formed to said recording medium by moving said light source while irradiating with the light transmitted selectively through said plurality of filters.

* * * * *